Patented June 8, 1954

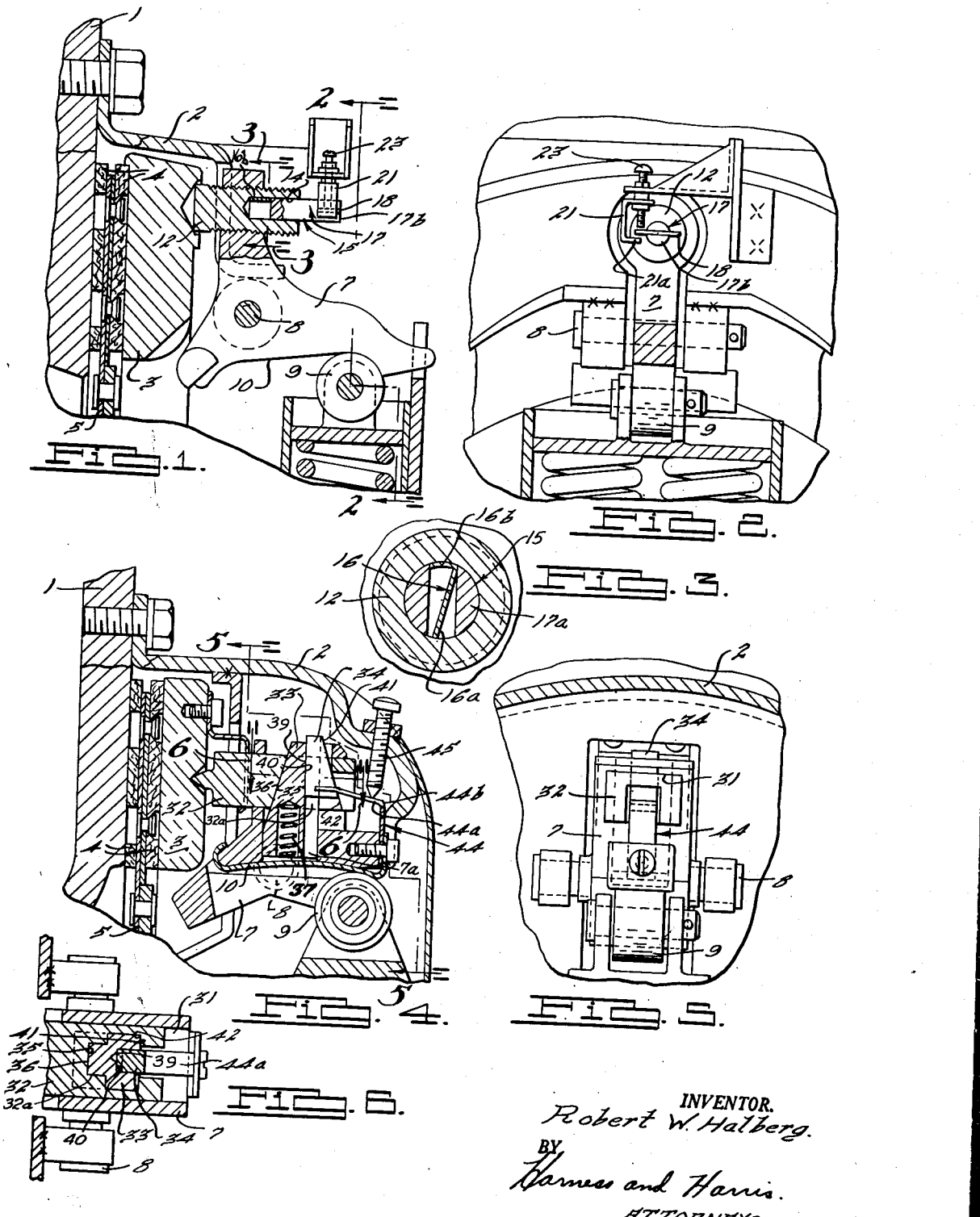

2,680,505

UNITED STATES PATENT OFFICE 2,680,505

AUTOMATIC WEAR ADJUSTING MECHANISM

Robert W. Halberg, Chicago, Ill., assignor to Chrysler Corporation, Highland Park, Mich., a corporation of Delaware Application February 19, 1948, Serial No. 9,491

2 Claims. (Cl. 192—111)

This invention relates to an automatic adjusting mechanism particularly adapted for use as a wear take-up mechanism for frictionally engageable clutch and brake devices.

It is an object of this invention to provide a simple, fool-proof, accurate, automatic adjusting mechanism to compensate for the wear of the frictionally engageable surfaces of a clutch, brake, or similar device.

It is a further object of this invention to provide an automatic wear-take-up mechanism for a device having a plurality of relatively movable members wherein the members are actuated by some form of pivotally or oscillatably mounted lever means. The wear take-up mechanism hereing disclosed is automatically operated by the increase in the amplitude of movement of the actuator means due to the wear of the frictionally engageable surfaces.

It is a further object of this invention to provide an adjusting mechanism that will automatically compensate for the normal wear of the associated parts of the device on which it is installed and thus maintain predetermined clearances between the associated parts throughout the life of the device.

It is a further object of this invention to provide an automatic wear take-up means that is operated by the actuating mechanism of the structure on which the take-up device is installed. By reason of this feature the number of parts of the take-up device is reduced to a minimum and a positive form of automatic adjusting means is provided.

Additional objects and advantages of this invention will become apparent from the specification and attached drawings wherein:

Fig. 1 is a sectional side elevational view of one form of my adjusting mechanism shown associated with the related parts of a plate-type frictional clutch assembly;

Fig. 2 is a rear elevational view of the mechanism shown in Fig. 1;

Fig. 3 is a sectional view taken along the line 3—3 of Fig. 2 illustrating the shape and arrangement of the ratchet mechanism gripping member;

Fig. 4 is a sectional side elevational view of a modified form of adjusting mechanism shown associated with the related parts of a plate-type friction clutch assembly;

Fig. 5 is a rear elevational view of the adjusting mechanism shown in Fig. 4; and Fig. 6 is a sectional elevational view taken along the line 6—6 of Fig. 4.

The automatic adjusting mechanism constituting this invention is particularly useful in connection with friction clutches or friction brakes similar to the clutch shown in the applicant's co-pending application Serial No. 8,099, filed February 13, 1948, and now Patent Number 2,562,613, but is not restricted to such mechanisms as it is possible of adaptation to any form of mechanism wherein an automatic adjusting device is desired. In the drawings the adjusting mechanism has been shown associated with a friction clutch assembly wherein 1 represents a flywheel to which a cover plate 2 is suitably connected. Floatingly supported within the cover plate 2 is a pressure plate 3 adapted to be moved into and out of engagement with the friction facings 4 of the clutch disc 5. Pivotally mounted on the cover plate 2 is a pressure plate actuator lever 7 adapted to be rocked about its pivot pin 8 by means of a reciprocatably mounted roller 9 which rides along the trackway 10 of the actuator 7. Due to the slopes of the trackway 10 and the position of the actuator pivot pin 8, an over-center mechanism is provided for rocking the actuator lever 7 about its pivot point when the roller 9 rides along the trackway 10. Threadably mounted in actuator lever 7 is a stud 12 having its forward end bearing against the pressure plate 3. Stud 12 is adapted to be turned up against pressure plate 3 to vary the clearances between the flywheel 1, the pressure plate 3, and the friction facings 4.

By means of threaded stud 12 the normal clearances between the friction facings, the flywheel and the pressure plate may be varied and automatically controlled. The rearwardly protruding end of stud 12 contains a bore 14 adapted to receive a ratchet or free-wheeling mechanism 15. This mechanism 15 is adapted to cause the rotation of the stud 12 in a clockwise direction such that the forward end of stud 12 will be moved towards the pressure plate 3. This ratchet or free-wheeling mechanism comprises a one-way gripping member 16 carried in the bifurcated forward end 17a of the rod-like key operator 17. Gripping member 16 is a substantially L-shaped bent spring strip which is diametrically disposed in the bore 14 of stud 12. The side leg 16a of gripping member 16 is adapted to pivot about the base leg 16b when torque is applied to the side leg through the key operator 17. Clockwise rotation of the side leg 16a causes the free end edges of legs 16a and 16b to bite into the wall of the bore 14 and a torque transmitting connection results. When side leg 16a is turned counterclockwise it is swung about the base leg 16b and this disengages the free end edges of the legs 16a and 16b from the wall of the bore 14 and the member 16 rotates in the bore 14. Because the free end edges of member 16 bite into the walls of the bore 14 when member 16 is turned clockwise the stud 12 is rotated in a clockwise direction. When gripping member 16 is rotated in a counterclockwise direction it slips in the bore 14 of stud 12 and there is relative motion between the gripping member 16 and stud 12 with no rotation of stud 12.

The means for applying torque to the gripping member 16 includes the key operator 17 which has a rearwardly extending portion 17b protruding from the stud bore 14. This portion 17b is provided with turning wings 18. One of the wings 18 is adapted to be positioned between the leg portions of the U-shaped bracket member 21 which is mounted on the cover plate 2. Bracket member 21 carries an adjusting screw 23, the threaded end of which is adapted to be located adjacent the wing 18 that is positioned within bracket 21.

As the roller 9 reciprocates along the trackway 10, of the clutch lever actuator 7, the actuator 7 is rocked about its pivot pin 8 and the stud means 12 is moved into and out of engagement with the pressure plate 3. When stud means 12 is forced against pressure plate 3 the friction facings 4 are frictionally engaged with the flywheel 1 and the pressure plate 3. After repeated engagement of the friction facings 4 with pressure plate 3 and flywheel 1 the friction facings 4 become worn and consequently it requires increased pivotal movement of actuator 7 to cause engagement of these members.

The ratchet mechanism 15 and the particular arrangement of its associated control elements provides means for converting the increased amplitude of pivotal movement of the actuator lever 7 into an operating means for the automatic adjusting mechanism herein disclosed. By positioning a key operator wing 18 between the bracket leg 21a and the threaded end of adjusting screw 23, there is provided a means for rotating the key operator 17 in a clockwise direction as the wear of the friction facings 4 increases the amplitude of pivotal movement of the actuator 7. Rotation of operator 17 results from the successive engagement of wing 18 with screw 23 and bracket leg 21a as roller 9 reciprocates along trackway 10 during operation of lever actuator 7. On the rearward movement of roller 9 the actuator 7 is rocked forwardly and if clutch facings 4 are worn this engages wing 18 with the threaded end of adjusting screw 23 and consequently rotates the key operator 17 in a counterclockwise direction. Due to the ratchet connection between the key operator 17 and the stud 12 this counterclockwise rotation of the key operator 17 does not turn the stud 12 but the counterclockwise rotation of the wing 18 reduces the amplitude of uninterrupted swing of wing 18 on the return swing of the actuator 7. Subsequently, as roller 9 moves forwardly along trackway 10, to rock actuator 7 rearwardly, the wing 18 is forced against the leg 21a of the bracket 21 and this rotates the key member 17 in a clockwise direction. Clockwise rotation of the key operator 17 turns the stud 12 in a clockwise direction and threads the stud forwardly through its threaded mounting in actuator 7 thereby moving the pressure plate 3 closer to the friction facings 4 of the clutch disc 5.

As long as there is no appreciable wear of the friction facings 4 the actator 7 has substantially constant amplitude of swing about its pivot pin 8 and the wing 18 of key operator 17 is not pressed into engagement with either the adjusting screw 23 or the leg 21a of the bracket 21. Whenever wear of the friction facings 4 causes any appreciable increase in the amplitude of pivotal movement of the actuator 7, engagement of the key operator wing 18 with the adjusting screw 23 and bracket leg 21a occurs and this automatically threads the stud means 12 forwardly to compensate for the reduced thickness of the friction facings 4. Consequently, the clearances between the friction facings, the pressure plate and the flywheel face are maintained substantially constant.

It is obvious that a pitch for the threads of the stud means 12 can be selected so as to produce any desired forward movement of the stud means 12 for any predetermined increase in the amplitude of swing of the actuator lever 7.

The modified form of adjusting mechanism disclosed in Figs. 4 through 6 is shown applied to the same friction clutch construction illustrated in Figs. 1 through 3 and all elements common to both forms carry the same reference numerals. This modified form of adjusting mechanism differs from that shown in Figs. 1 through 3, by having a wedge-operated, slidably mounted, thrust member 32 adapted to actuate the pressure plate 3 instead of the threadably mounted actuating stud member 12 shown in Figs. 1 to 3. In this modified form the pivoted actuator lever 7 has a longitudinally extending passageway 31 in which is slidably mounted the link or bolt-like thrust member 32. Thrust link 32 is adapted to be adjustably positioned in the passageway 31 of lever 7 by means of rearrangeable, spring-pressed, cooperating wedge blocks 33 and 34 mounted in a transversely extending slot 7a on the lever actuator 7 and having portions extending into transversely extending slot 32a in the thrust member 32. Positioning wedge block 33 has an inclined forwardly facing surface 35 adapted to bear against and ride along an inclined surface 36 formed on the forward wall portion of the transversely extending slot through the thrust member 32. As positioning wedge 33 is moved outwardly in a direction normal or transverse to the length of the thrust member 32, the thrust member 32 is urged forwardly and the clearances between the flywheel 1, the friction facings 4 and the pressure plate 3 are reduced. If positioning wedge 33 is retracted towards the actuator lever trackway 10 then the thrust member 32 can be moved rearwardly to increase the clearances between the flywheel, friction facings and pressure plate. Spring 37 tends to urge positioning wedge 33 outwardly to hold it firmly against the thrust member 32. Locking wedge block 34 has a forwardly facing surface 39 bearing against and adapted to reciprocate along a mating surface 40 formed on the near side of positioning wedge 33. Locking wedge 34 also has an inclined surface 41 adapted to engage an inclined surface 42 formed on the rear wall portion of the transversely extending slot 32a through the thrust member 32. A hingedly mounted spring strip 44 urges locking wedge 34 outwardly into engagement with the rear surface 40 of positioning wedge 33 and the inclined surface 42 of thrust member 32. Spring means 44 is hingedly mounted on the actuator lever 7 and has a forwardly extending lever arm 44a connected to the locking wedge 34.

The cover plate 2 carries a set screw 45 which is positioned so as to have an end engageable with the forwardly extending lever arm 44a of spring strip 44 whenever wear of the clutch friction faces 4 causes an increase in the amplitude of pivotal movement of the actuator lever 7. Due to the location of the set screw 45, with respect to the hinging edge 44b of spring means 44, it is possible to get a magnification in the movement of the locking wedge 34 compared to the actual movement of the spring lever arm 44a adjacent the point of contact of the set screw stop means 45 and the lever arm 44a.

This wedge block form of adjusting mechanism functions as follows: As long as there is no appreciable wear of the friction facings 4 the actuator lever 7 rocks about its pivot pin 8 and the amplitude of pivotal movement of the lever 7 is substantially constant. Accordingly, the spring strip lever arm 44a is not engaged with the stop means 45 and there is no relative movement between the positioning and locking wedge members 33 and 34 consequently there is no change in the effective length of the thrust member 32. When friction facings 4 become reduced in width, due to wear or the like, then the amplitude of pivotal movement of the actuator lever 7 will be increased and the spring strip lever arm 44a will be pressed against the stop means 45 during rearward movement of roller 9 whereupon locking wedge 34 will be moved downwardly towards the trackway 10 of actuator lever 7. As locking wedge 34 moves downwardly the wedging lock between blocks 33 and 34 is broken and this permits rearrangement of the blocks, the spring 37 automatically moving the positioning wedge 33 upwardly or outwardly from trackway 10 when spring lever arm 44a moves block 34 downwardly or inwardly towards trackway 10. When positioning wedge 33 moves upwardly or outwardly away from trackway 10 the cooperating surfaces 35 and 36, of the positioning wedge and the thrust member respectively, cause a forward movement of the thrust member 32 and this forward movement increases the effective length of the thrust member 32 and compensates for the wear of the friction facings 4.

By choosing the correct angles for the cooperating wedge surfaces of this automatic adjusting means and by selecting materials with proper coefficients of friction it is possible to accurately control the movement of the thrust member 32 and the wedges 33 and 34 by means of this relatively simple, ingenious mechanism.

I claim:

1. An automatic adjusting means for a pair of relatively movable, frictionally engageable, members comprising a pivotally mounted actuator means for said members mounted on one of said members, thrust transmitting means adjustably mounted on said actuator adapted to transmit motion from said actuator means to the other member, a pair of engaged, wedge blocks rearrangeable relative to one another mounted on said actuator means and having portions engageable with said thrust means, said wedge blocks having resilient means associated therewith tending to hold the blocks in predetermined relationships, while permitting said blocks to be rearranged to move the thrust means and thereby increase the effective length of said thrust means, and stop means associated with one of said members and positioned so as to be automatically engaged with and to immediately cause rearrangement of at least one of said wedge blocks when there is any increase in the amplitude of pivotal movement of said actuator means to maintain the selected amplitude of movement of the actuator means.

2. An automatic adjusting means for a plurality of relatively movable members comprising a pivotally mounted actuator means for said members, thrust means adapted to transmit motion from said actuator means to one of said members, said thrust means being adjustably mounted on said actuator means through a wedge block mechanism carried by said actuator means comprising a spring-pressed positioning block and a spring-pressed locking block operatively associated whereby rearrangement of the position of said locking block varies the effective length of said thrust means, and stop means associated with one of said members adapted to be engaged with and to immediately cause a shift in the position of said locking block whenever there is a change in the normal amplitude of pivotal movement of said actuator means whereby the effective length of said thrust means is varied to regain the normal amplitude of pivotal movement of said actuator means.

UNITED STATES PATENTS

References Cited in the file of this patent

| Number | Name | Date |
| --- | --- | --- |
| 1,922,054 | Magee et al. | Aug. 15, 1933 |
| 2,002,841 | Tatter | May 28, 1935 |
| 2,040,034 | Tatter | May 5, 1936 |
| 2,057,802 | Tatter | Oct. 20, 1936 |
| 2,057,803 | Tatter | Oct. 20, 1936 |
| 2,154,082 | Baker | Apr. 11, 1939 |
| 2,160,752 | Oliver | May 30, 1939 |
| 2,183,668 | Burkhardt | Dec. 19, 1939 |
| 2,207,051 | Colman | July 9, 1940 |